United States Patent [19]
Kazecki et al.

[11] Patent Number: 5,182,749
[45] Date of Patent: Jan. 26, 1993

[54] RECEIVER FOR RECOVERING DATA IN A FORWARD AND REVERSE DIRECTION IN TIME

[75] Inventors: Henry L. Kazecki, Arlington Heights; James C. Baker, Hanover Park, both of Ill.

[73] Assignee: Motorola, Inc., Schaumburg, Ill.

[21] Appl. No.: 633,556

[22] Filed: Dec. 21, 1990

[51] Int. Cl.⁵ .............................................. H04J 3/06
[52] U.S. Cl. .................... 370/100.1; 375/56; 375/83
[58] Field of Search .............. 370/100.1, 94.1, 109; 375/39, 52, 56, 83, 94, 99, 106

[56] References Cited

U.S. PATENT DOCUMENTS

| | | | |
|---|---|---|---|
| 4,158,748 | 6/1979 | En | 178/69.1 |
| 4,174,505 | 11/1979 | Querry | 375/56 |
| 4,217,660 | 8/1980 | En | 371/44 |
| 4,271,520 | 6/1981 | Coombes et al. | 371/42 |
| 4,312,074 | 1/1982 | Pautler et al. | 375/96 |
| 4,442,531 | 4/1984 | Gupta et al. | 375/94 |
| 4,603,322 | 7/1986 | Blair | 340/347 |
| 4,608,702 | 8/1986 | Hirzel et al. | 375/110 |
| 4,611,334 | 9/1986 | Engel et al. | 375/100 |
| 4,688,232 | 8/1987 | Fox | 375/87 |
| 4,710,945 | 12/1987 | Bocci et al. | 375/100 |
| 4,803,703 | 2/1989 | DeLuca et al. | 375/116 |
| 4,821,297 | 4/1989 | Bergmann et al. | 375/83 |
| 4,829,543 | 5/1989 | Borth et al. | 375/83 |

Primary Examiner—Douglas W. Olms
Assistant Examiner—Shick Hom
Attorney, Agent, or Firm—Kevin D. Kaschke; Raymond A. Jenski; John A. Fisher

[57] ABSTRACT

A differential quadrature PSK receiver (100) recovers serial data in a forward and reverse direction in time using a forward and reverse mode PLL (232) and decoder switch (108). The DQPSK receiver (100) is particularly useful for recovering a packet of serial data (Rx) having a time-varying signal level and a relatively long duration. Sync words in the packet (Rx) or adjacent packets (Ry) provide starting points from which the data is recovered. The direction in time of data recovery is dependent on the quality of the time-varying signal level in the packet (Rx).

21 Claims, 5 Drawing Sheets

RECEIVER FOR RECOVERING DATA IN A FORWARD AND REVERSE DIRECTION IN TIME

FIELD OF THE INVENTION

The present invention relates generally to information signal recovery, and more particularly to a receiver for recovering data in a forward and reverse direction in time.

BACKGROUND OF THE INVENTION

The rapid expansion of the number of cellular radio telephones coupled with the desire to provide additional services has prompted the development of a new standard. The standard suggests an increase in system capacity over the current analog system through the use of digital modulation and speech coding techniques. The standard uses a time division multiplex (TDM) system which splits the current channel into six signal packets of which three are currently in use. A packet is a burst of information characterized by sequentially encoded symbols for the intended receiver. The linear modulation technique to transmit the digital information within the channel is $\pi/4$ DQPSK (differential quadrature phase shifted keying).

The use of $\pi/4$ DQPSK linear modulation in the U.S. Digital Cellular system provides spectral efficiency allowing the use of 48.6 kbps channel data rates. $\pi/4$ DQPSK transmits the data information by encoding consecutive pairs of bits, commonly known as symbols, into one of four phase angles ($\pm\pi/4$, $\pm 3\pi/4$) based upon gray encoding. These angles are then differentially encoded producing an 8 point constellation.

Cellular systems operate in the existing 800 MHz band. Radio propagation at these frequencies is generally characterized by three types of distortion: time dispersion distortion, multipath distortion and lognormal distortion. Time dispersion distortion of a received signal occurs when a transmitted signal is received via more than one propagation path each having a different path length. Measured received signals having time dispersion distortion typically have a strong first component and multiple components that are generally lower in amplitude for larger delays. Time dispersion distortion of the received signal is usually found in an environment where a large reflecting source, such as a mountain, is present. A mobile radio in this environment receives the signal from a fixed source transmitter and the delayed signal from the reflecting source. The time delay between the reception of the two signals results in time dispersion distortion.

Multipath distortion is characterized by many rays of the same signal having different energy levels reaching the receiver at the same time. The number, phase and intensity of the signals received by the receiver in a multipath environment may vary over time as a result of repositioning of the receiver, or of the objects from which a transmitted signal is reflected. As a result, the phase and signal level of a received signal varies over time. This variance is referred to as "fading" of the signal. The resultant signal strength and rate of change of signal strength at the receiver is predominantly determined by how rapidly the receiver is moving through its environment, and the frequency of the channel being used. For instance, in the cellular frequency band, and when a cellular radio telephone is positioned in a vehicle traveling at 60 mph, the signal strength of the received signal can vary by approximately 20 decibels during a 5 millisecond period.

In the case of time dispersion and multipath distortion, two received signals transmitted from the same source which are 180 degrees out of phase effectively cancel each other out. The received signal's intensity approaches a null and the rate of change of the received signal intensity over time is rapid. Since the received signal strength intensity is low, the modulated information can be corrupted by noise present in the channel. A signal corrupted by noise can alter the state of the demodulated information thereby causing the receiver to detect wrong information.

Lognormal distortion of a received signal occurs when the distance between the transmitting source and the receiver increases thereby causing a logarithmic decrease in the signal strength at the receiver. The distance at which lognormal distortion begins depends upon the transmitter's signal power and the receiver's sensitivity. As the distance between the transmitting source and the receive increases, the received signal strength intensity may decrease to a level whereby the modulated information is corrupted by noise present in the channel. As with time dispersion and multipath distortion, a signal corrupted by noise can alter the state of the demodulated information thereby causing the receiver to detect wrong information.

Recovering a signal packet having time-varying signal intensity is feasible when the packet is relatively short. For example, variation of the signal intensity over a packet having a 0.5 millisecond duration is usually not significant enough to alter the state of the information in the packet. If the entire packet is lost in noise, the performance of the system would not be substantially degraded. The packet with short duration contains less information than longer duration packets. The signal's intensity is considered to be constant over the duration of the packet while the information in the packet is recovered.

However, systems which specify a signal packet having a relatively long duration, for example, 6.66 millisecond duration in the U.S. Digital Cellular system, variation in the signal strength intensity can be significant. Variations can cause the signal intensity to approach the noise floor of the channel thereby corrupting the information in the packet thereby causing the receiver to recover wrong information.

Thus, a formidable challenge is to provide a system for recovering information in a time-varying signal packet having a long duration.

SUMMARY OF THE INVENTION

Briefly stated, the invention comprises an apparatus for recovering a signal packet included in a serial data signal, wherein the packet is formed of multiple sequential symbols and a predetermined symbol. The predetermined symbol has a predetermined position and value.

A receiver receives the serial data signal. A direction of recovery is determined for the symbol sequential to the predetermined symbol. The symbol is recovered in the determined direction. The recovery direction is changed between the determined direction and a second direction. The recovered symbol is stored.

DETAILED DESCRIPTION OF A PREFERRED EMBODIMENT

Figure 1:
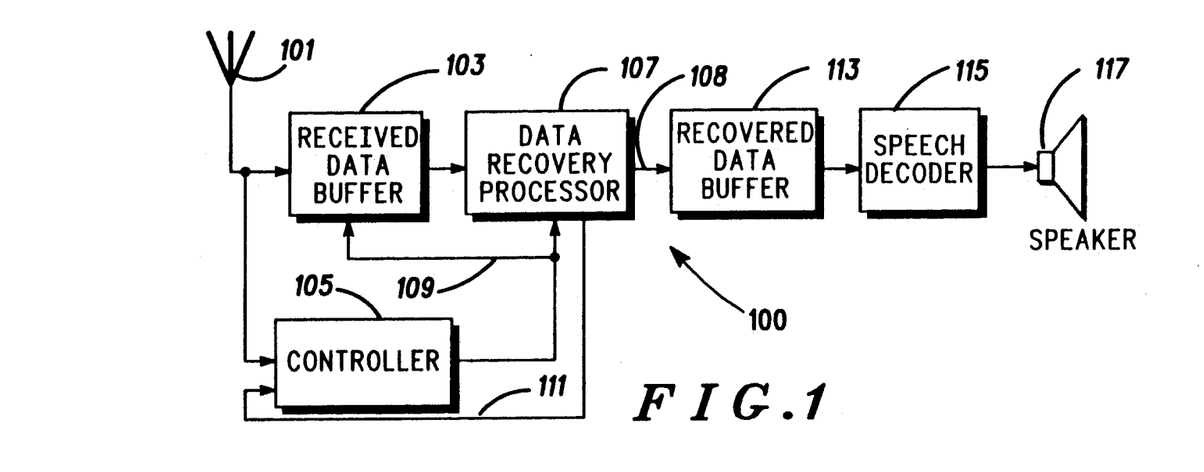
FIG. 1 is a block diagram of a TDM receiver constructed in accordance with the present invention.

Referring now to the drawings, a block diagram of a TDM receiver 100 shown in FIG. 1 has been constructed in accordance with the present invention. The TDM receiver overcomes the aforementioned problems by recovering the signal packet in a forward and reverse direction in time depending on the intensity of the signal. Groups of known symbols called words, having fixed positions and values within the packet, provide starting points from which the information is recovered. The packet is recovered in a direction responsive to the signal intensity over the duration of the packet.

The receiver 100 includes an antenna 101 which couples the packet intended for the receiver 100 to a receive data buffer 103 and a mode controller 105. The receive data buffer 103 provides a storage location for the packet while its information is being recovered. A control signal at line 109, generated by a mode controller 105, is coupled to the receive data buffer 103 and a data recovery processor 107. The control signal at line 109 determines if the information in the signal packet will be coupled from the received data buffer 103 to the data recovery processor 107 in a forward or reverse direction. The mode controller 105 generates the control signal at line 109 in response to the signal packet and a quality signal at line 111 coupled from the data recovery processor 107.

The quality signal at line 111 is a value related to the quality of the signal's intensity varying with time over the duration of the packet. In alternate embodiments, the quality signal may also comprise other signal parameters such as the signal's phase. If the intensity of the received signal approaches a null during information recovery, the mode controller 105 signals the receive data buffer 103 and the data recovery processor 107 to begin recovering the packet in a forward direction from one starting point until it reaches a null. The information in the packet continues to be recovered from a new starting point on the other side of the null in the reverse direction until it reaches the null. Recovering the packet in both a forward and reverse direction in time improves the likelihood of detecting the correct information, thereby reducing the bit error rate for the received signal.

In an alternate embodiment, the signal packet may be recovered in both a forward and reverse direction from multiple predetermined starting points to multiple predetermined ending points. For example, recovery of the packet may begin at a first starting point and recover data in the forward direction until it reaches the ending point. Then recovery continues from a second starting point in a reverse direction until it reaches the same ending point. Recovering data from multiple starting points improves the bit error rate for the received signal. An advantage of the alternate embodiment is utilized when a null is present at any point in the packet. Under conventional forward processing conditions, after the occurance of the null, information in the packet is lost. Using the recovery process described in the alternate embodiment, information recovery may continue at other starting points toward ending points to recover the majority of data which may have otherwise been lost.

The data recovery processor 107 generally equalizes, detects, tracks the carrier phase and decodes the information in the packet. The recovered data appearing on line 108 from the data recovery processor 107 is coupled to a recovered data buffer 113. The recovered data buffer 113 is a location for storing recovered data 108 from the packet as it is recovered. After all the information in a packet is recovered, the data is coupled from the recovered data buffer 113 to a speech decoder 115. The speech decoder 115 converts the digitized signal, received in the encoded information packet, into speech which may be heard through a speaker 117.

Figure 2:
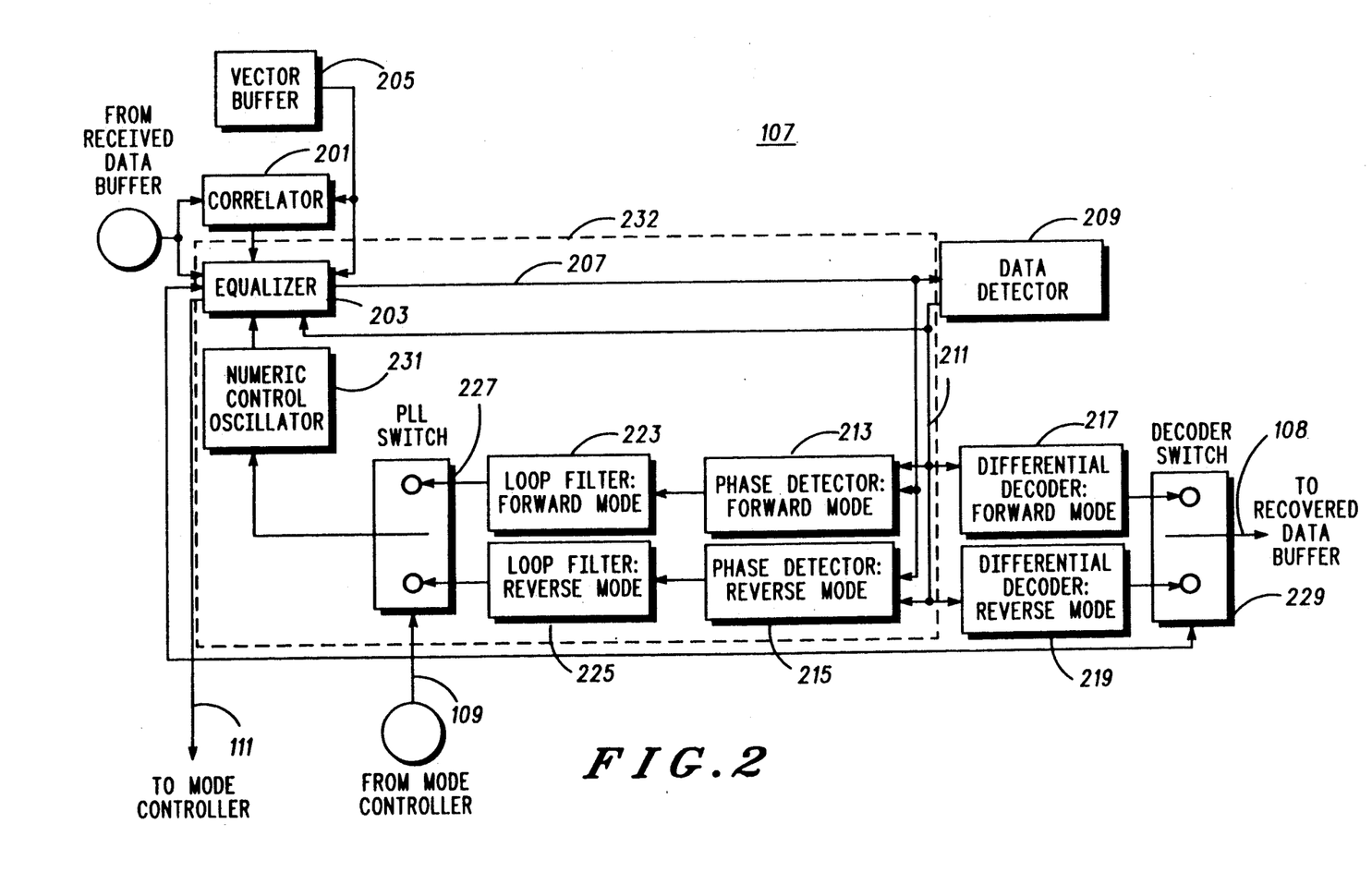
FIG. 2 is a block diagram of a data recovery processor included in the receiver in FIG. 1.

Now referring to FIG. 2, there is shown a block diagram of the data recovery processor 107. The equalizer 203, phase detector 213 or 215, the loop filter 223 or 225, the PLL switch 227 and the NCO 231 comprise a phase lock loop (PLL) 232. The detected data from the phase lock loop is decoded and stored in the recovered data buffer of FIG. 1. The loop filter, phase detector and differential decoder each have a forward and reverse processing mode. The forward processing mode of each function is conventionally implemented. The reverse processing mode of each function is performed by modifying the conventional implementations.

Data from the receive data buffer 103 is coupled to a conventional correlator 201 and an equalizer 203. The correlator 201 has three purposes. The first purpose is to initialize the training sequence for the equalizer 203 by sampling the magnitude of the received signal. The second purpose is to initialize the carrier phase of the received signal. The third purpose is to determine the optimum sample rate for clock recovery. The implementation of a conventional correlator may be further studied in a technical paper entitled "Performance of an Implemented Complex Correlator with a Simulated Stationary Dispersive Radio Channel" (© 1988) presented at an IEEE European Conference on Electronics by Bo Olsson. The equalizer 203 corrects time delay problems caused by time dispersion distortion.

Figure 6:
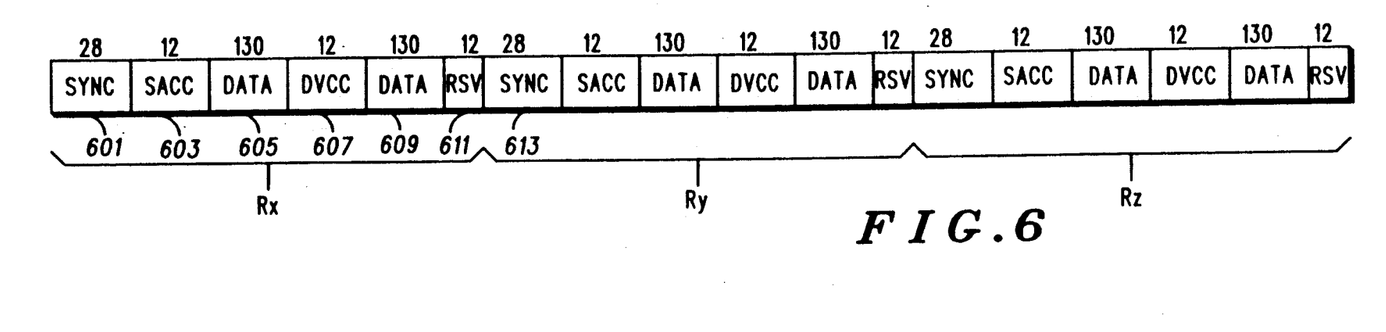
FIG. 6 represents a channel state diagram for a TDM packet sequence for a typical land-to-mobile station transmission which is utilized by the present invention.

Predetermined symbols within the packet are stored in vector buffer 205. The vector buffer is conventionally implemented using storage locations of a device having memory. The location of the predetermined symbols within the packet is better appreciated by reference to FIG. 6. FIG. 6 represents a channel state diagram for a TDM packet sequence for a typical land-to-mobile station transmission which the present invention utilizes to its advantage. The TDM packet shown in FIG. 6 has a standard format that has been established for use in the U.S. Digital Cellular System. The TDM system splits the channel into three packets of information: $R_X$, $R_Y$ and $R_Z$. Each packet is assigned to a unique receiver. The format of each signal packet is the same. Each signal packet is divided into six adjacent groups of symbols. A signal packet begins with a Sync word 601, having 28 symbols, for synchronizing the location of the packet within the TDM system and for equalizer training. The slow associated control channel (SACC) word 603, having 12 symbols, represents commands from the land station to the mobile station such as a hand-off required between cells. Next are 130 symbols of data 605 followed by 12 symbols representing a digital voice color code (DVCC) 607. Next are 130 symbols of data 609 followed by 12 symbols reserved (RSV) 611 for future use. The two sets of data symbols, 605 and 609, represent a digitized speech signal. The DVCC 607 differentiates between two cells in the TDM system having the same frequency which eliminates co-channel interference. The DVCC 607 is assigned to a receiver when it enters a new cell.

The sync word 601 in the received signal packet, $R_X$ is called the desired sync word since the $R_X$ packet is intended for the receiver in the preferred embodiment. A sync word 613 in the adjacent $R_Y$ packet is called the adjacent sync word. A feature of the preferred embodiment of the present invention is to use the desired sync word 601, adjacent sync word 613 and the DVCC 607 as starting points for processing information in the $R_X$ packet in both forward and reverse directions in time. The value and position of these starting points within their respective packets are predetermined and known to the receiver and are stored in vector buffer 205 of FIG. 2.

Returning now to FIG. 2, the vector buffer 205, storing the predetermined symbols, is coupled to the correlator 201 and the equalizer 203. The correlator 201 uses the predetermined symbols to determine which packet to receive. The equalizer 203 uses the predetermined symbols from the vector buffer 205 to initialize the equalizer process.

The purpose of the conventional data detector 209 is to quantize the information in the packet. Data detection for QPSK Modulation in a TDMA System is further discussed in U.S. Pat. No. 5,067,139. A quantized signal at line 211, generated by the data detector 209, is coupled to the forward and reverse mode phase detector 213 and 215, a forward and reverse mode differential decoder 217 and 219 and the equalizer 203. The forward and reverse mode phase detectors 213 and 215 use the equalized signal at line 207 and the quantized signal at line 211 to produce an estimate of the phase error in the received signal. The equalizer 203 uses the quantized signal at line 211 to update the coefficients in an algorithm embodied within the equalizer 203. Based on the equalizer's performance, the equalizer will generate a quality signal at line 111 coupled to the mode controller 105 of FIG. 1. Responsive to the quality signal at line 111, the mode controller 105 changes the direction of recovering the packet.

The phase error estimate signal of the forward mode phase detector 213 is coupled to the forward mode loop filter 223. Likewise, the phase error estimate signal of the reverse mode phase detector 215 is coupled to the reverse mode loop filter 225. The loop filters reduce the distortion in the phase error estimate signals and control the response time of the PLL. The filtered outputs of the forward mode 223 and the reverse mode 225 loop filters are coupled to a PLL switch 227. The PLL switch 227, responsive to the control signal at line 109, couples the appropriate filtered signal from the forward or reverse mode loop filter 223 or 225 to the conventional numeric controlled oscillator (NCO) 231. The NCO 231 generates an adjusted phase signal which is coupled to the equalizer 203.

The decoder switch 229, responsive to the control signal 109, couples the appropriate decoded signal from either the forward 217 or reverse 219 mode differential decoder to the recovered data buffer 113 in FIG. 1.

Figure 7:
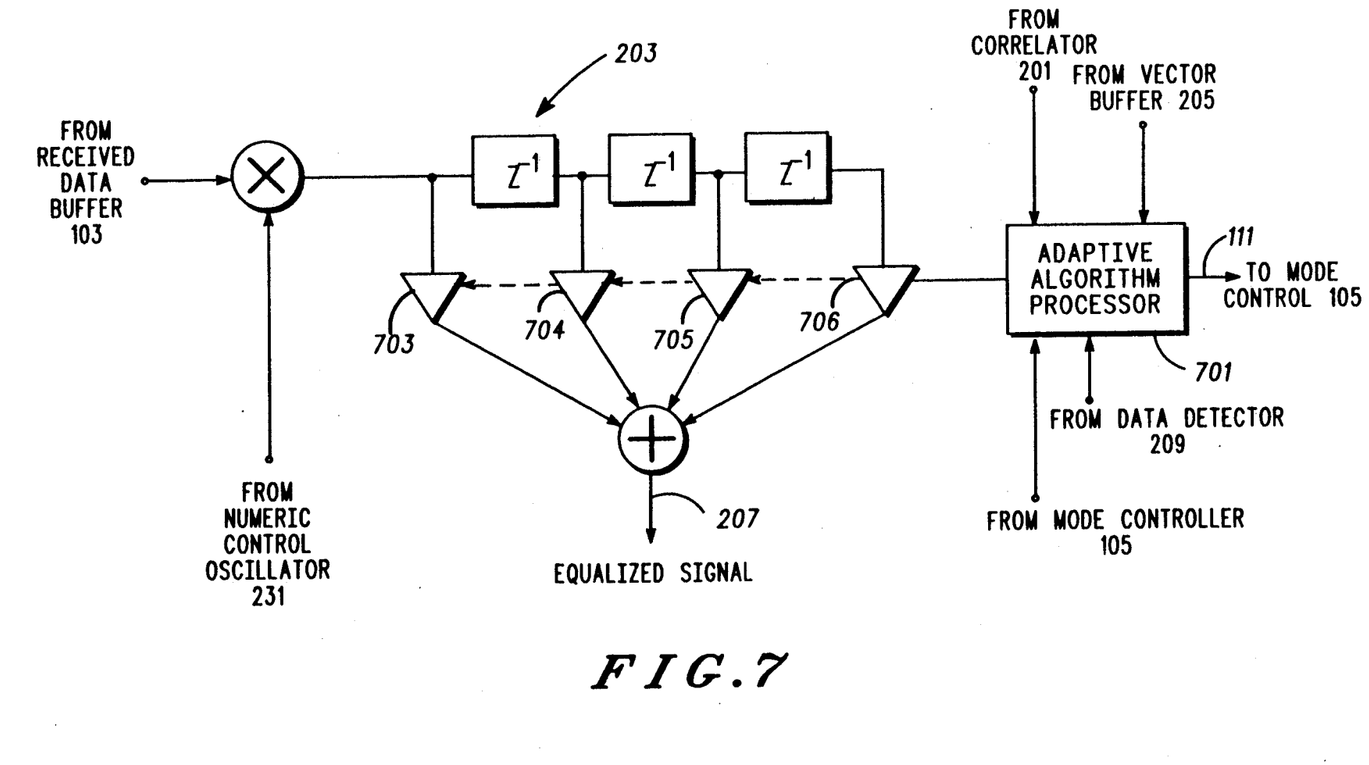
FIG. 7 is a block diagram of an equalizer included in the data recovery processor of FIG. 2.

A block diagram of the equalizer 203 is represented in FIG. 7. The structure of the equalizer 203 is conventional. A feature of the preferred embodiment is in the utilization of an adaptive algorithm processor 701 to process data in forward and reverse direction in time. Adaptive algorithms which may be used to implement the present invention are discussed in a text book entitled "Digital Communications", second edition, by John Proakis, © 1989, section 6.4.2. The adaptive algorithm processor 701 uses information from the mode controller 105 to determine the direction of signal recovery. Other information from the data detector 209 is used to modify the gain stages 703 through 706 and to generate the quality signal at line 111 for the mode controller 105.

Figure 3A:
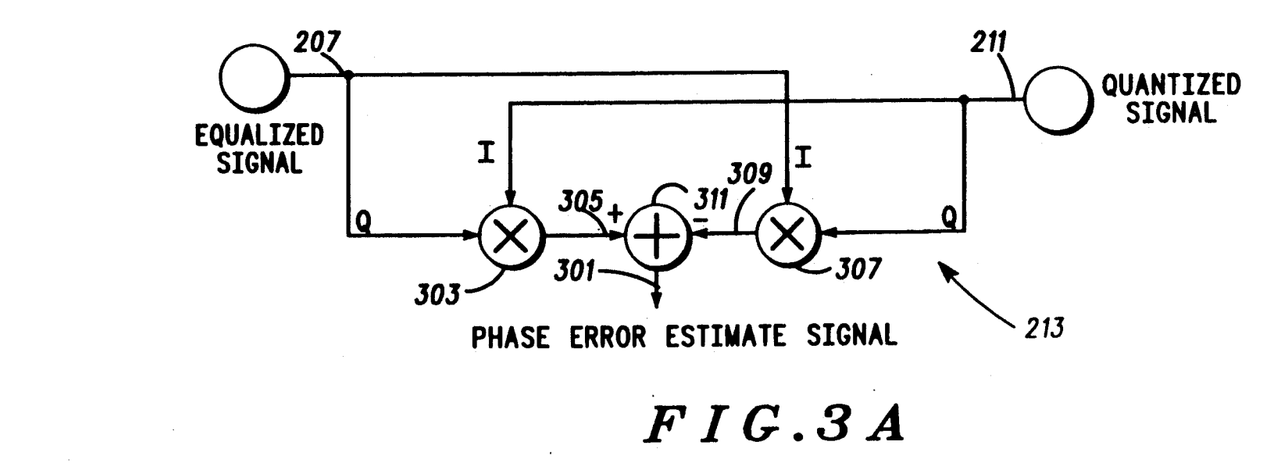
FIG. 3A is a block diagram of a phase detector operating in a forward processing mode included in the data recovery processor of FIG. 2.

FIG. 3A is a block diagram of the conventional phase detector 213 operating in a forward processing mode. The purpose of the phase detector 213 is to produce an estimate of the phase error signal 301. The inputs to the phase detector 213 are the equalized signal at line 207 and the quantized signal at line 211. The quadrature-phase component (Q) of the equalized signal at line 207 is combined with the in-phase component (I) of the quantized signal at line 211 in mixer 303 to produce a positive error signal 305. Likewise, the quadrature-phase component (Q) of the quantized signal at line 211 is combined with the in-phase (I) component of the equalized signal at line 207 in mixer 307 to produce a negative error signal 309. The positive error signal 305 and negative error signal 309 are combined in a summer 311 to produce a phase error estimate signal 301.

Figures 3B, 4A, 4B:
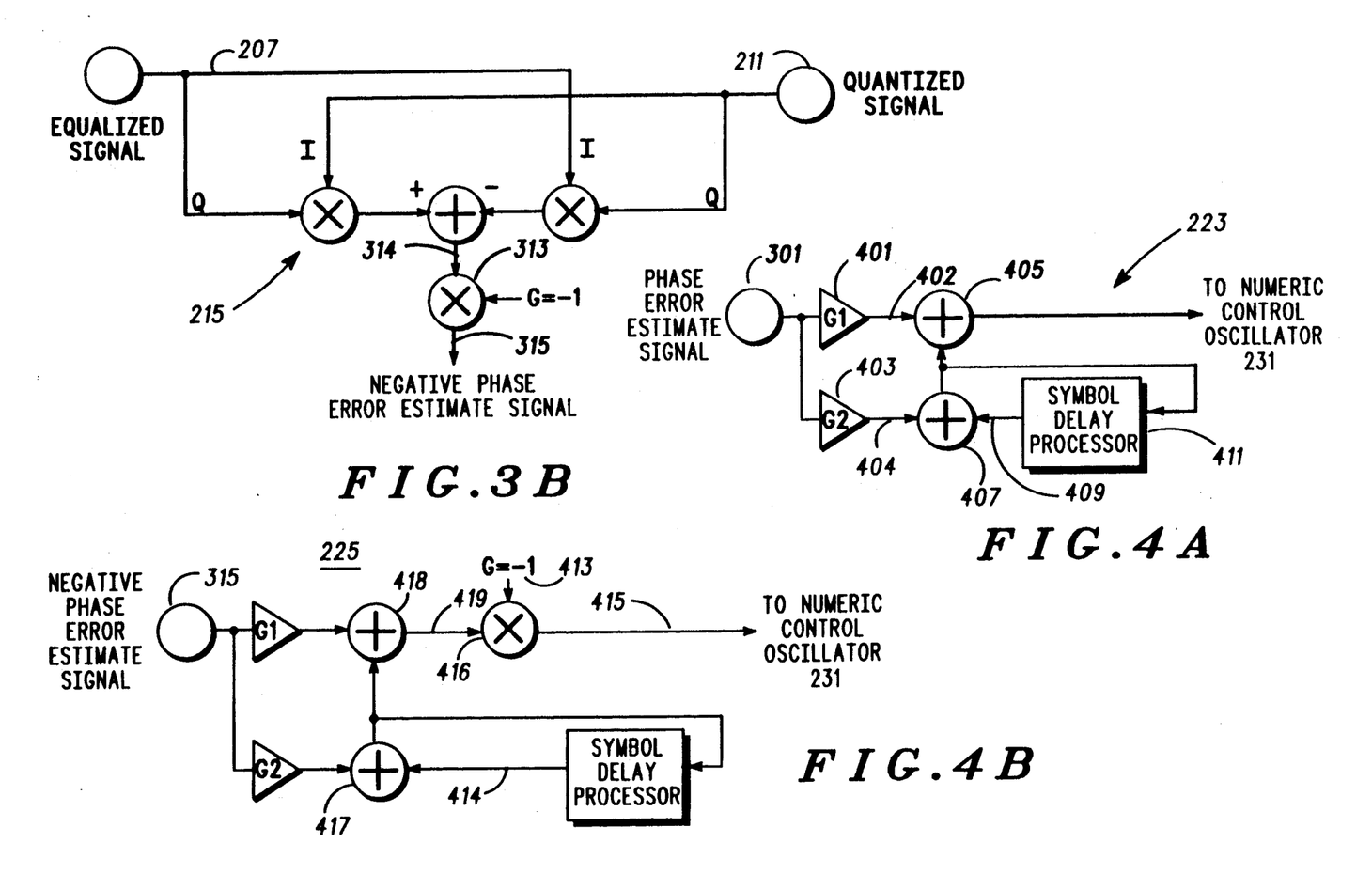
FIG. 3B is a block diagram of a phase detector operating in a reverse processing mode included in the data recovery processor of FIG. 2.
FIG. 4A is a block diagram of a loop filter operating in a forward processing mode included in the data recovery processor of FIG. 2.
FIG. 4B is a block diagram of a loop filter operating in a reverse processing mode included in the data recovery processor of FIG. 2.

FIG. 3B is a block diagram of a phase detector operating in a reverse processing mode. The reverse mode phase detector generates a negative phase error estimate signal 315 having opposite polarity to the phase error estimate signal generated by the forward mode phase detector. This is accomplished by combining a negative unity gain signal, G, with the phase error estimate signal at line 314 in mixer 313.

FIG. 4A is a block diagram of the conventional loop filter 223 operating in a forward processing mode. The loop filter 223 generates a filtered phase error signal for the NCO to track the instantaneous phase of the received signal packet. The loop filter 223 also tracks the long term frequency variation of the received signal. The loop filter 223 comprises a second order infinite impulse response filter. The phase error estimate signal at line 301 is coupled to amplifiers 401 and 403. The gain of each amplifier 401 and 403, determines the response time of the loop filter 223. The output of amplifier 401 is coupled to summer 405. Likewise, the output of amplifier 403 is coupled to summer 407. The output of summer 407 is determined from the summation of the second gain signal 404 and a symbol delay signal at line 409. The output of summer 407 is coupled to summer 405 and symbol delay processor 411. The output of summer 405 is coupled to the numeric controlled oscillator 231 of FIG. 2.

FIG. 4B is a block diagram of a loop filter operating in a reverse processing mode. This block diagram is identical to the block diagram of the forward processing mode in FIG. 4A except the output of the filter 415 is negated. In FIG. 4B a negative unity gain signal 413 is combined in a mixer 416 with the output signal of summer 418 at line 419 to generate the filtered output signal 415. The negative unity gain signal 413 reverses the direction of rotation of the filtered signal at line 419 before it is coupled to the NCO 231. For the reverse mode, the instantaneos phase error of the received signal must be tracked in the opposite direction from the forward mode. The long term frequency variation must also be tracked in the opposite direction from the forward mode.

Figure 5A:
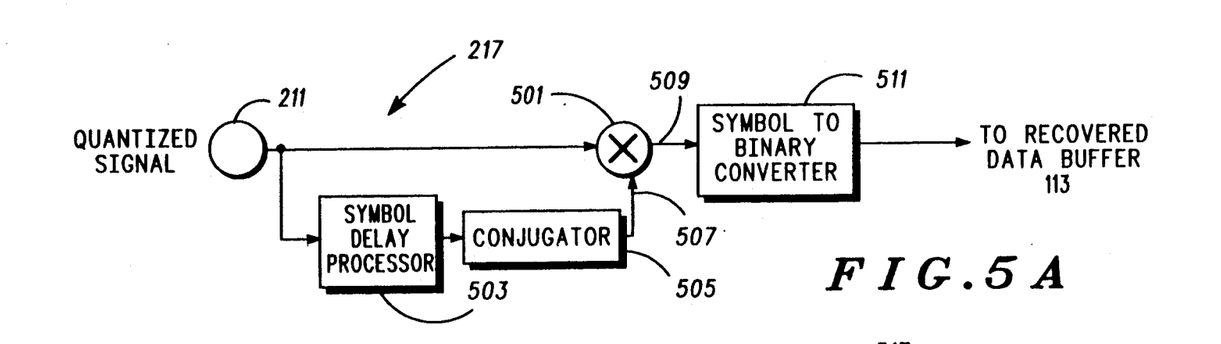
FIG. 5A is a block diagram of a differential decoder operating in a forward processing mode included in the data recovery processor of FIG. 2.

FIG. 5A is a block diagram of a differential decoder 217 operating in a forward processing mode. The quantized signal 211 is coupled to a mixer 501 and symbol delay processor 503. The symbol delay processor 503 is coupled to the mixer 501 through a conjugator 505. The mixer 501 combines the quantized signal at line 211 and the delayed and conjugated quantized signal at line 507 to produce a rotated signal at line 509. The rotated signal at line 509 is coupled to a symbol to binary converter 511. The symbol to binary converter 511 converts the rotated signal detected in the information packet into a two bit binary pair. The two bit binary pair is coupled to the recovered data buffer 113 of FIG. 1.

Figure 5B:
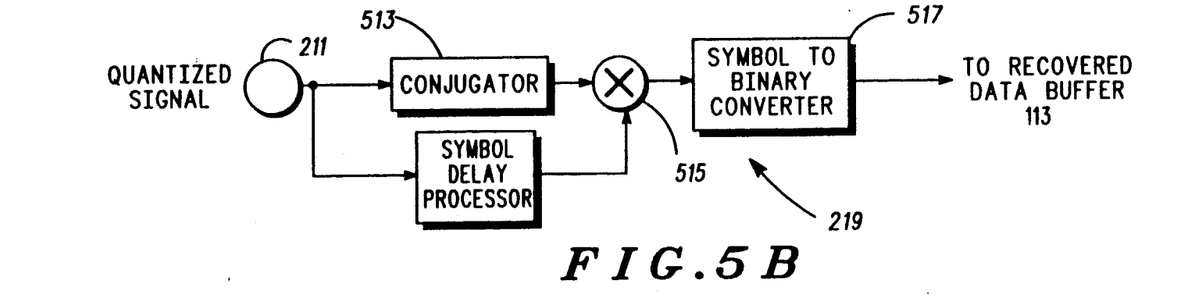
FIG. 5B is a block diagram of a differential decoder operating in a reverse processing mode included in the data recovery processor of FIG. 2.

FIG. 5B is a block diagram of a differential decoder operating in a reverse processing mode. The difference between the reverse mode in FIG. 5B and the forward mode in FIG. 5A is the position of the conjugator 505 as shown in FIG. 5B. The conjugator 513 is positioned between the incoming quantized signal at line 211 and the mixer 515. Moving the position of the conjugator 513 allows the quantized signal to be properly decoded in the reverse order from the forward processing mode. Symbol delay processors as shown in FIGS. 4A, 4B, 5A, 5B and 7 produce a one symbol delay of the processed data in the time domain. The symbol delay processors may be conventionally implemented using a D-type flip flop.

Thus, a TDM receiver for detecting information in a time-varying signal having a long duration has been disclosed. The information in the packet is processed from predetermined starting points, in a direction responsive to the intensity of the signal over the duration of the packet.

We claim:

1. An apparatus for recovering at least one signal packet included in a serial data signal, wherein the packet is formed of multiple sequential symbols and at least one predetermined symbol, the at least one predetermined symbol having a predetermined position and value, said apparatus comprising:
   means for receiving the serial data signal;
   means for determining a direction in time of recovery for at least one symbol sequential to the at least one predetermined symbol;
   means for recovering said at least one symbol in said determined direction;
   means for changing between said determined direction and a second direction; and
   means for storing said at least one recovered symbol.

2. An apparatus in accordance with claim 1 wherein said means for receiving further comprises a time division multiplex receiver.

3. An apparatus in accordance with claim 1 wherein said serial data signal further comprises a time division multiplex signal.

4. An apparatus in accordance with claim 1 wherein said means for determining a direction of recovery further comprises means for measuring a time-varying parameter related to said at least one symbol.

5. An apparatus in accordance with claim 4 wherein said time-varying parameter further comprises an energy level of said at least one symbol.

6. An apparatus in accordance with claim 1 wherein said means for determining a direction of recovery further comprises means for recovering a predetermined number of said symbols.

7. An apparatus in accordance with claim 1 wherein said at least one predetermined symbol further comprises a digital voice color code.

8. An apparatus in accordance with claim 1 wherein said at least one predetermined symbol further comprises an sync word adjacent to the packet.

9. An apparatus in accordance with claim 1 wherein said at least one predetermined symbol further comprises an sync word.

10. An apparatus in accordance with claim 1 wherein said means for recovering said at least one symbol in a forward direction further comprises:
    means for generating an equalized signal responsive to said serial data signal;
    means for generating a quantized signal responsive to said equalized signal;
    means for generating a forward direction phase error signal responsive to said equalized and quantized signals;
    means for generating a forward direction filtered signal responsive to said forward direction phase error signal;
    means for adjusting a phase signal responsive to said forward direction filtered signal;
    means for adjusting the phase of said serial data signal responsive to said adjusted phase signal; and
    means for decoding said quantized signal to generate a forward direction recovered signal.

11. An apparatus in accordance with claim 1 wherein said means for recovering said at least one symbol in a reverse direction further comprises:
    means for generating an equalized signal responsive to said serial data signal;
    means for generating a quantized signal responsive to said equalized signal;
    means for generating a reverse direction phase error signal responsive to said equalized and quantized signals;
    means for generating a reverse direction filtered signal responsive to said reverse direction phase error signal;
    means for adjusting a phase signal responsive to said reverse direction filtered signal;
    means for adjusting the phase of said serial data signal responsive to said adjusted phase signal; and
    means for decoding said quantized signal to generate a reverse direction recovered signal.

12. An apparatus in accordance with claim 11 wherein said means for decoding said quantized signal further comprises conjugating said quantized signal.

13. A method for recovering at least one signal packet included in a serial data signal, wherein the packet is formed of multiple sequential symbols and at least one predetermined symbol, the at least one predetermined symbol having a predetermined position and value, said method comprising:
receiving the serial data signal;
determining a direction in time of recovery for at least one symbol sequential to the at least one predetermined symbol;
recovering said at least one symbol in said determined direction;
changing between said determined direction and a second direction; and
storing said at least one recovered symbol.

14. A method in accordance with claim 13 wherein said step of receiving further comprises receiving a time division multiplex signal.

15. A method in accordance with claim 13 wherein said step of determining a direction of recovery further comprises measuring a time-varying parameter related to said at least one symbol.

16. A method in accordance with claim 13 wherein said step of determining a direction of recovery further comprises recovering a predetermined number of said symbols.

17. A method in accordance with claim 13 wherein said step of recovering said at least one symbol in a forward direction further comprises the steps of:
generating an equalized signal responsive to said serial data signal;
generating a quantized signal responsive to said equalized signal;
generating a forward direction phase error signal responsive to said equalized and quantized signals;
generating a forward direction filtered signal responsive to said forward direction phase error signal;
adjusting a phase signal responsive to said forward direction filtered signal;
adjusting the phase of said serial data signal responsive to said adjusted phase signal; and
decoding said quantized signal to generate a forward direction recovered signal.

18. A method in accordance with claim 13 wherein said step of recovering said at least one symbol in a reverse direction further comprises the steps of:
generating an equalized signal responsive to said serial data signal;
generating a quantized signal responsive to said equalized signal;
generating a reverse direction phase error signal responsive to said equalized and quantized signals;
generating a reverse direction filtered signal responsive to said reverse direction phase error signal;
adjusting a phase signal responsive to said reverse direction filtered signal;
adjusting the phase of said serial data signal responsive to said adjusted phase signal; and
decoding said quantized signal to generate a reverse direction recovered signal.

19. A method in accordance with claim 18 wherein said step of decoding said quantized signal further comprises conjugating said quantized signal.

20. An apparatus for recovering at least one signal packet included in a serial data signal, wherein the packet is formed of multiple sequential symbols and at least a first and second predetermined symbol, said at least first and second predetermined symbols each having a predetermined position and value, said apparatus comprising:
means for receiving the serial data signal;
means for recovering at least one symbol sequential to the first predetermined symbol in a forward direction in time;
means for recovering at least one symbol sequential to the second predetermined symbol in a reverse direction in time; and
means for storing said recovered at least one symbol.

21. A method for recovering at least one signal packet included in a serial data signal, wherein the packet is formed of multiple sequential symbols and at least a first and second predetermined symbol, said at least first and second predetermined symbols each having a predetermined position and value, said method comprising the steps of:
receiving the serial data signal;
recovering at least one symbol sequential to the first predetermined symbol in a forward direction in time;
recovering at least one symbol sequential to the second predetermined symbol in a reverse direction in time; and
storing said recovered at least one symbol.

* * * * *